(12) United States Patent
Ono

(10) Patent No.: US 7,315,689 B2
(45) Date of Patent: Jan. 1, 2008

(54) RECORDING SYSTEM

(75) Inventor: Tachio Ono, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1215 days.

(21) Appl. No.: 10/029,674

(22) Filed: Dec. 31, 2001

(65) Prior Publication Data
US 2002/0093693 A1 Jul. 18, 2002

(30) Foreign Application Priority Data
Jan. 15, 2001 (JP) ............................. 2001-006980

(51) Int. Cl.
*H04N 5/91* (2006.01)
(52) U.S. Cl. .......................................... 386/95; 386/65
(58) Field of Classification Search .................. 386/38, 386/85, 65, 79, 95
See application file for complete search history.

(56) References Cited

U.S. PATENT DOCUMENTS 5,748,234 A * 5/1998 Lippincott ............... 348/222.1
5,751,809 A * 5/1998 Davis et al. ................. 713/176
6,038,368 A * 3/2000 Boetje et al. .................. 386/52
6,081,692 A * 6/2000 Hayato ....................... 340/7.51
6,483,878 B1 * 11/2002 Yonezawa et al. ..... 375/240.25
6,538,684 B1 * 3/2003 Sasaki ..................... 348/14.08

* cited by examiner

*Primary Examiner*—Thai Q. Tran
*Assistant Examiner*—Daquan Zhao
(74) *Attorney, Agent, or Firm*—Fitzpatrick, Cella, Harper & Scinto

(57) ABSTRACT

A recording system for preventing inconsistencies between the time information of the AV data which is recorded on the recording medium of the image sensing device (camera integrated digital video recorder and so on), and the time information of the AV data which is recorded on the recording medium of an external recording device. The image sensing device determines whether or not the AV data is recorded on its recording medium when the AV data is digitally output. If it is recorded, the AV data is digitally output with adding change-prohibited information. The external recording device determines whether or not the change-prohibited information is added to the AV data which has been digitally input. If the change-prohibited information is added, the AV data is recorded to a recording medium without changing the time information of the AV data.

16 Claims, 4 Drawing Sheets

RECORDING SYSTEM

BACKGROUND OF THE INVENTION

1. Field of the Invention

The present invention relates to an image sensing device which outputs AV (Audio Video) data including video data, audio data, and time information; an external recording device which records the AV data; and a recording system which is composed of the image sensing device and the external recording device.

2. Description of the Related Art

In recent years, camera integrated digital video recorders (hereinafter, referred to image sensing devices) which are equipped with digital communication interfaces conforming to the IEEE 1394-1995 (hereinafter, referred to as the IEEE 1394 interface) have been developed. In an image sensing device equipped with the IEEE 1394 interface, it is possible to digitally output, through the IEEE 1394 interface, the AV data that is being sensed by the image sensing device when the device is in a camera mode.

Also, recently, external recording devices for recording AV data, which is digitally output from the IEEE 1394 interface of the image sensing device, have been developed.

However, with a conventional external recording device, there have been cases where time information (for example, length of recording time, recording date, recording time, and so on) of AV data have been changed.

Consequently, when recording AV data, which has been recorded on the recording medium of an image sensing device, to an external recording device during recording, there has been a problem in that an inconsistency develops between the time information of the AV data which is recorded in the recording medium of the image sensing device and the time information the AV data which is recorded in the external recording device.

SUMMARY OF THE INVENTION

An object of the present invention is to solve the above-described problem. The present invention is made in view of the problem described above, and an object is to prevent inconsistencies between the time information of the AV data which is recorded on the recording medium of the image sensing device and the time information of the AV data which is recorded in the external recording device.

In a preferred embodiment of the present invention, there is provided a recording system including: an image sensing device which outputs AV data including video data, audio data, and time information; and an external recording device which records the AV data, wherein the image sensing device records the AV data on a recording medium, and when externally outputting the AV data, the image sensing device sends control information prohibiting the change of the time information of the AV data, and wherein the external recording device perform recording without changing the time information of the AV data when the control information is detected.

Still other objects of the present invention, and the advantages thereof, will become fully apparent from the following detailed description of the embodiment.

DESCRIPTION OF THE PREFERRED EMBODIMENT

In the following, a preferred embodiment of the present invention will be described with reference to the drawings.

Figure 1:
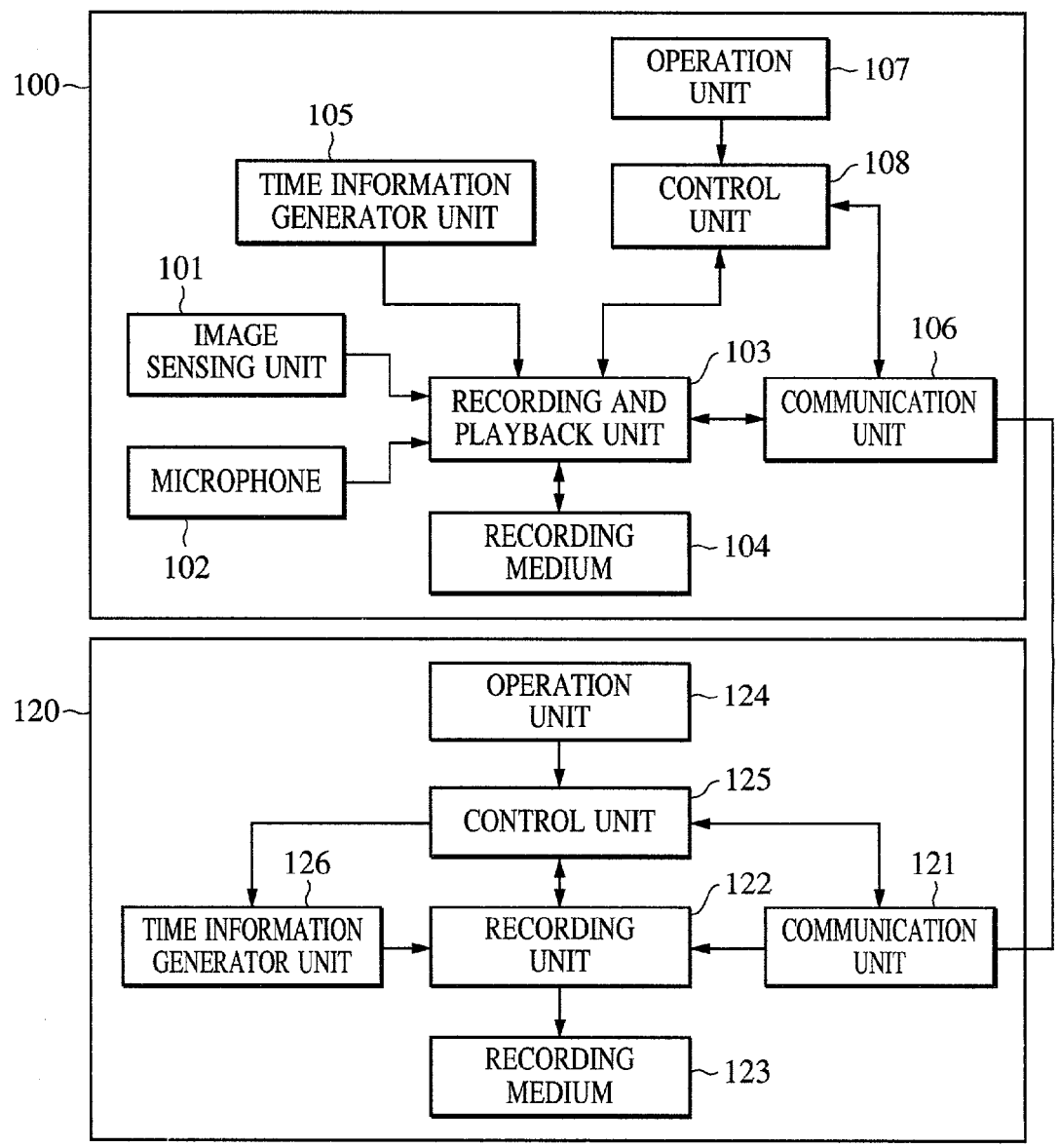
FIG. 1 is a block diagram illustrating a recording system according to an embodiment of the present invention.

FIG. 1 illustrates a recording system according to an embodiment of the present invention. In FIG. 1, reference numeral 100 denotes a camera-integrated digital video recorder (hereinafter, referred to as an image sensing device), and 120 denotes an external recording device for recording AV data which is digitally output from the image sensing device 100. In this regard, the external recording device can be realized as, for example, a hard disk device.

Next, a description will be given of the structure of the image sensing device 100 according to the present embodiment with reference to FIG. 1. In FIG. 1, reference numeral 101 denotes an image sensing unit, reference numeral 102 denotes a microphone, reference numeral 103 denotes a recording and playback unit, reference numeral 104 denotes a recording medium, reference numeral 105 denotes a time-information generator unit, reference numeral 106 denotes a communication unit, reference numeral 107 denotes an operation unit, and reference numeral 108 denotes a control unit.

The image sensing device 100 is provided with a camera mode and a VCR mode. Users can select the camera mode or the VCR mode by operating the operation unit.

If the camera mode is selected, the control unit 108 directs the image sensing unit 101 and the microphone 102 to operate to start image sensing of the AV data, and sets the recording and playback unit 103 to a recording state or recording pausing state. At this time, if the communication unit 106 is connected with the external recording device 120, the control unit 108 digitally output the AV data, which is generated in the recording and playback unit 103, from the communication unit 106. In this regard, while the device is in this mode, users can operate the operation unit 107 to set the recording and playback unit 103 to a recording state or a recording pausing state.

Also, if the VCR mode is selected, the control unit 108 causes the image sensing unit 101 and the microphone 102 to stop their operations, and causes the recording and playback unit 103 to operate. In this regard, when the device is in this mode, users can operate the operation unit 107 to playback, pause playing back, forward, or rewind the AV data which is recorded in the recording medium 104.

In the camera mode, the image sensing unit 101 picks up an optical image of an object and generates digital video data. The digital video data which is generated by the image sensing unit 101 is supplied to the recording and playback unit 103. Also, the microphone 102 collects outside sound and generates digital audio data in the camera mode. The digital audio data which is generated by the microphone 102 is supplied to the recording and playback unit 103.

Time-information generator unit 105 generates various types of time information (for example, a time code indicating the recording time at which the recording and playback unit 103 started recording, a time code indicating the date when the recording started, and a time code indicating the hour, minute, and second when the recording started, and so on. This time information is supplied to the recording and playback unit 103.

The recording and playback unit 103 generates AV data which conforms to the data format (for example, SD (Standard Definition) format) which is prescribed in the digital VCR system (hereinafter, referred to as DV system) for home use which was decided at the HD DIGITAL VCR CONFERENCE. This AV data includes the digital video data which was generated by the image sensing unit 101, the digital audio data which was generated by the microphone 102, and the time information which was generated by the time information generator unit 105

The AV data which the recording and playback unit 103 records on the recording medium 104, or the AV data which is played back from the recording medium 104 is supplied to the communication unit 106.

The communication unit 106 is provided with a digital communication interface which conforms to the IEEE 1394-1995 standard. When the communication unit 106 is connected to the external recording device 120, and when it becomes possible for the communication unit 106 to digitally output data, the communication unit 106 outputs the AV data supplied from the recording and playback unit 103 in accordance with a predetermined protocol (for example, a communication protocol which conforms to IEC 61883 standard).

Figure 4:
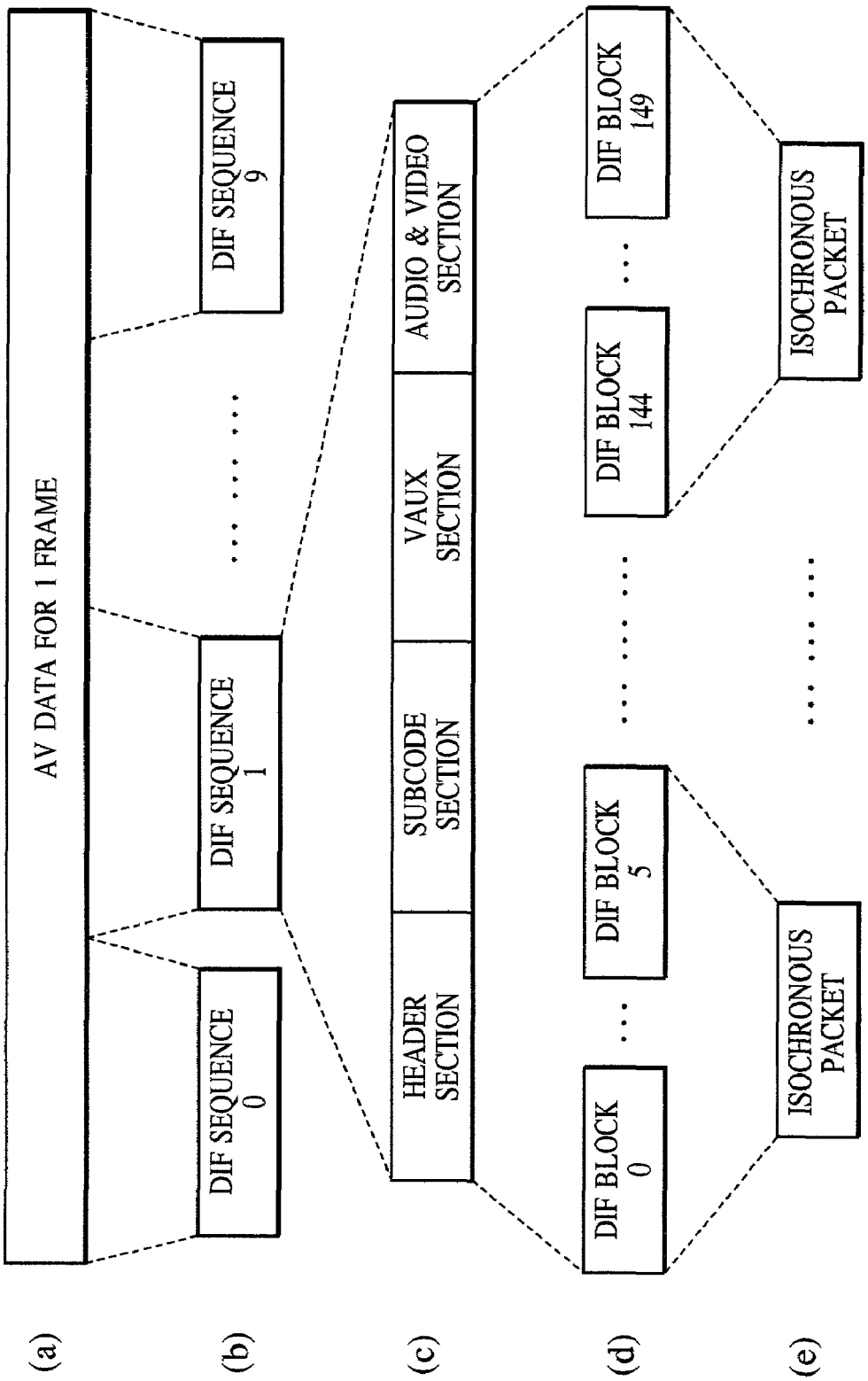
FIG. 4 illustrates AV data which is digitally output from the image sensing device according to the embodiment of the present invention.

With reference to FIG. 4, a description will be given of the procedure in which the image sensing device 100 of the present embodiment digitally outputs the AV data, which conforms to the SD format of the 525-60 system (NTSC system), by a communication protocol which conforms to the IEC 61883.

First, as shown in FIGS. 4(a) and 4(b), the communication unit 106 generates 10 pieces of DIF sequences from the AV data for one frame which is supplied from the recording and playback unit 103. As shown in FIG. 4(c), each DIF sequence is composed of a header section, a subcode section, a VAUX section, and an audio & video section. In this regard, additional data such as the time information which is generated by the time information generator unit 105 is stored in the subcode section, and digital video data and digital audio data is stored in the audio & video section.

Next, as shown in FIGS. 4(d) and 4(e), the communication unit 106 generates 150 pieces of DIF blocks from each DIF sequence, and an isochronous packet for each of the six DIF blocks. An isochronous packet is digitally output every 125 μm, conforming to the isochronous transfer method prescribed by the IEEE 1394-1995 standard.

Also, the communication unit 106 adds the control information (hereinafter, referred to change-prohibited information) for prohibiting recording by changing the time information of the AV data, following the directions of the control unit 108. This change-prohibited information is added to a predetermined data area in the subcode section shown in FIG. 4(c). In other words, this change-prohibited information is added to every AV data for each frame.

Next, a description of the structure of the external recording device 120 according to the present embodiment will be given with reference to FIG. 1. In FIG. 1, reference numeral 121 is a communication unit, reference numeral 122 is a recording unit, reference numeral 123 is a recording medium, reference numeral 124 is an operation unit, reference numeral 125 is a control unit, and reference numeral 126 is a time-information generator unit.

The communication unit 121 is provided with a digital communication interface which conforms to the IEEE 1394-1995 standard in the same manner as the communication unit 106. The communication unit 121 inputs the AV data which is digitally output from the communication unit 106 of the image sensing device 100, following a predetermined protocol (for example, a communication protocol which conforms to IEC 61883 standard). The communication unit 121 receives an isochronous packet every 125 μm shown in FIG. 4(e), generates the AV data shown in FIG. 4(a) to supply it to the recording unit 122.

The control unit 125 checks the change-prohibited information which is added to the subcode section of the AV data. If the change-prohibited information is detected, the recording unit 122 records the AV data on the recording medium 123 without changing the time information of the AV data which is supplied from the communication unit 121. Otherwise, the recording unit 122 changes the time information of the AV data which is supplied to from the communication unit 121 to the time information which the time information generator unit 126 generates, and records it on the recording medium 123. In this regard, the data format of the AV data which the external recording device 120 records on the recording medium 123 is the same as the data format of the AV data which the image sensing device 100 records on the recording medium 104. Also, in the present embodiment, the recording medium 123 is a recording medium such as a magnetic disk, an optical disk, a hard disk, and so on.

Figure 2:
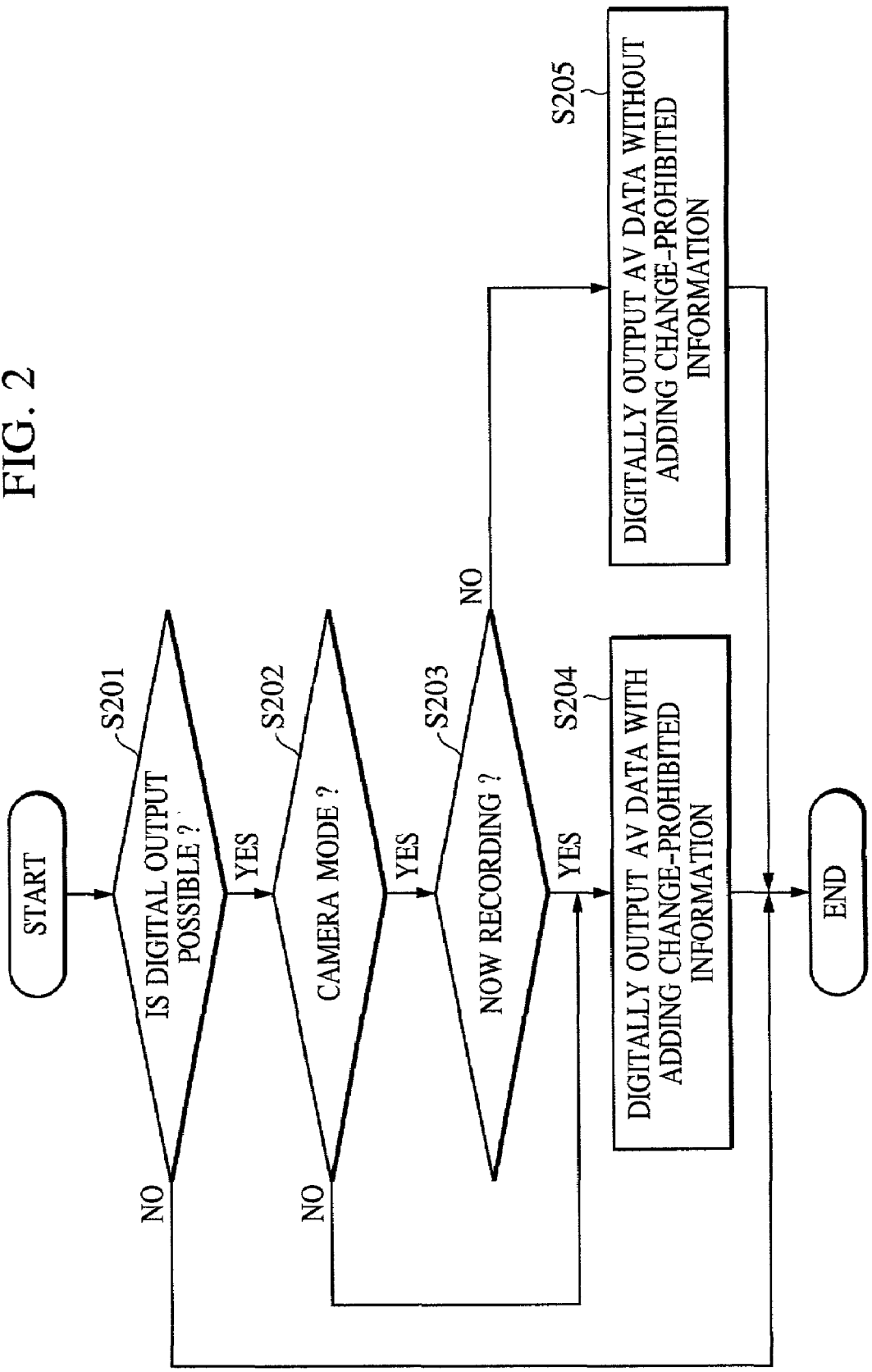
FIG. 2 is a flowchart illustrating the processing operations of the image-sensing device according to the embodiment of the present invention.

Next, a description will be given of the processing procedure of the image sensing device 100 according to the present embodiment with reference to FIG. 2. In this regard, a control program for the microcomputer, with which the control unit 108 for executing the processing steps shown in FIG. 2 is stored in the recording medium with which the control unit 108 is provided.

First, in step S201, the control unit 108 determines whether or not the communication unit 106 has become the state in which digital output is possible. When the external recording device 120 is connected to the communication unit 106, the communication unit 106 notifies the control unit 108 of the state in which digital output is possible.

Next, in step S202, the control unit 108 determines whether or not the operation mode of the image sensing device 100 is a camera mode. If it is the camera mode, the processing goes to step S203.

In step S203, the control unit 108 determines whether or not the recording and playback unit 103 is recording the AV data on the recording medium 104. If it is recording the AV data on the recording medium 104, the processing goes to step S204, otherwise, it goes to step S205.

In step S204, the control unit 108 controls the communication unit 106, and digitally outputs the AV data which is supplied from the recording and playback unit 103. At this time, the communication unit 106 digitally outputs the AV data with adding the change-prohibited information.

At the same time, in step S204, the control unit 108 controls the communication unit 106, and digitally outputs the AV data which is supplied from the recording and playback unit 103. At this time, the communication unit 106 digitally outputs the AV data without adding the change-prohibited information.

Figure 3:
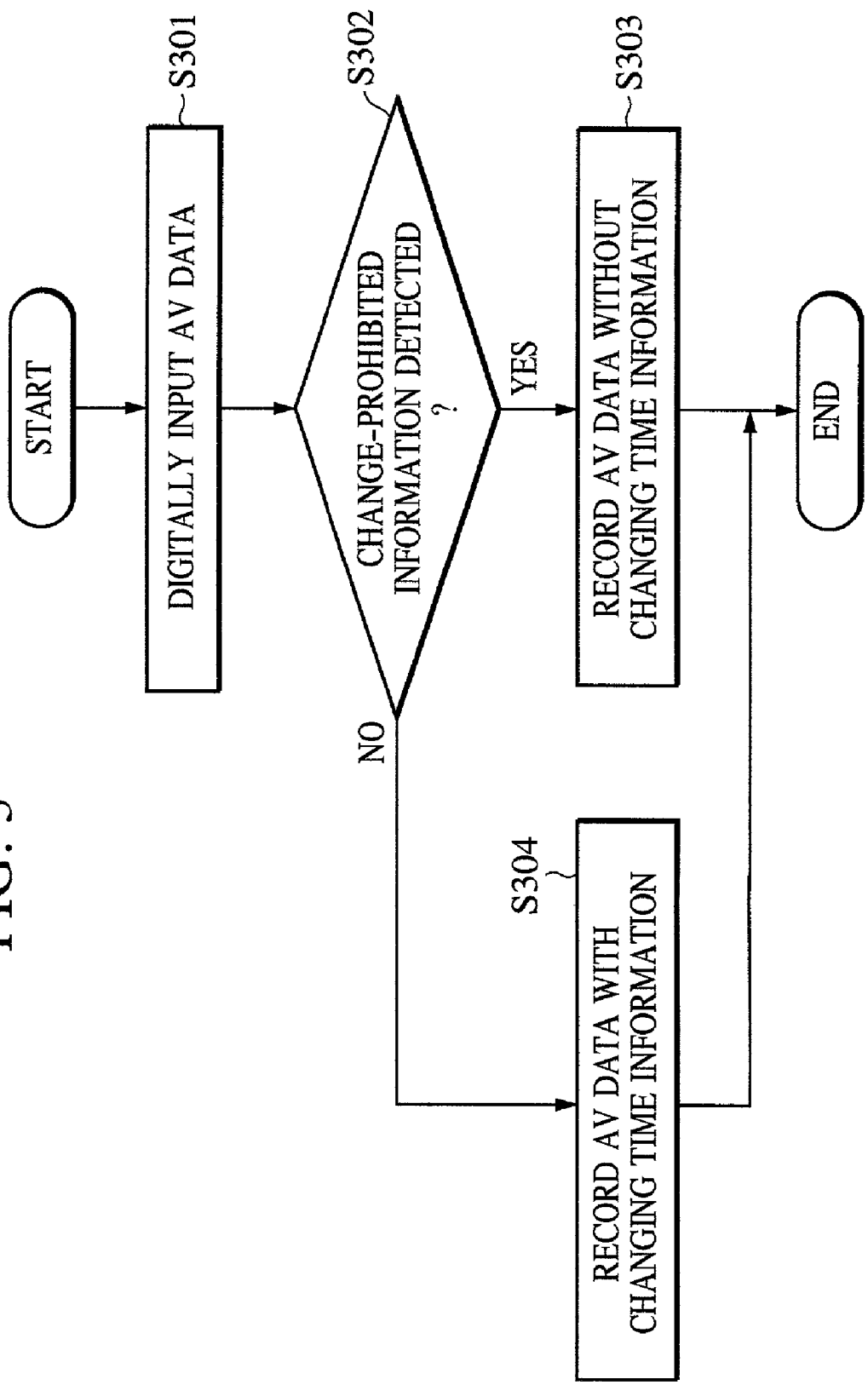
FIG. 3 is a flowchart illustrating the processing operations of the external-recording device according to the embodiment of the present invention.

Next, a description will be given of the processing procedure of the external recording device 120 according to the present embodiment with reference to FIG. 3. In this regard, a control program for the microcomputer, with which the control unit 125 is provided, to execute the processing steps shown in FIG. 3 is stored in the recording medium with which the control unit 125 is provided.

In step S301, the communication unit 121 digitally inputs the AV data which is digitally output from the image sensing device 100. The digitally input AV data is supplied to the recording unit 122.

In step S302, the control unit 125 checks the change-prohibited information of the AV data which is digitally input. If the change-prohibited information is detected, the processing goes to step S303, otherwise, it goes to step S304.

In step S303, the control unit 125 controls the recording unit 122, and records the AV data, which is supplied from the communication unit 121, on the recording medium 123. At this time, the recording unit 122 records the AV data without changing the time information of the AV data to the time information generated by the time information generator unit 126. As a result, the time information of the AV data which is recorded on the recording medium 123 becomes the same as the time information of the AV data which is recorded on the recording medium of the image sensing device 100.

In step S304, the control unit 125 controls the recording unit 122, and records the AV data, which is supplied from the communication unit 121, on the recording medium 123. At this time, the recording unit 122 records the AV data with changing the time information of the AV data to the time information generated by the time information generator unit 126. As a result, the time information of the AV data recorded on the recording medium 123 becomes different from the time information of the AV data recorded on the recording medium of the image sensing device 100.

As described above, with the image sensing device 100 of the present embodiment, when digitally outputting the AV data recorded on the recording medium 104, it is possible to digitally output the AV data with adding the change-prohibited information described above. Also, with the external recording device 120 of the present embodiment, when the AV data, which is digitally input, is added with the change-prohibited information described above, it is possible to record the AV data on the recording medium 123 without changing the time information of the AV data. With this arrangement, even when the AV data which is recorded on the recording medium 104 of the image sensing device 100 is switched to the recording medium 123 of the external recording device 120, it is possible to prevent inconsistencies between the time information of the AV data recorded on the recording medium 104 of the image sensing device 100 and the time information of the AV data recorded on the recording medium 123 of the external recording device 120.

In this regard, the shapes and structures of each unit of the embodiment described above are only one example of embodiments of the present invention, and the technical scope of the present invention should not be interpreted as being limited to this example. Therefore, the present invention can be achieved by various modifications without departing from the main spirit and features.

For example, the data format of the AV data according to the present embodiment is not limited to the data format which conforms to the DV method. The data format which conforms to the transport stream method of MPEG2 can be used.

Also, in the present embodiment, a description is given of the case where a digital interface which conforms to the IEEE 1394-1995 standard is used to connect the image sensing device 100 and the external recording device 120, but the present invention is not limited to this kind of structure. Any digital interface which can be mounted onto a camera integrated digital video recorder can be used between the image sensing device 100 and the external recording device external recording device 120. For example, any digital interface which conforms to the extended standard of the IEEE 1394-1995 standard, USB (Universal Serial Bus) 2.0 standard, and so on can be used.

Also, the present invention includes an embodiment in which a software program code for performing the functions of the embodiment described above is supplied to an apparatus connected to the various types of devices or to a computer in a system, and the various types of the devices are operated in accordance with the stored programs in the system or a computer (CPU or MPU) of the apparatus.

Also, in this case, an above-described software program code itself achieves the functions of the embodiment described above, thus the program code itself and means for supplying the program code to a computer, for example, a recording medium for storing such a program code constitutes the present invention. For a recording medium to store such a program code, for example, a floppy disk, a hard disk, an optical disk, an magneto-optical disk, a CD-ROM, a magnetic tape, a non-volatile memory card, a ROM, and so on can be used.

Also, the present invention includes not only a case where the functions of the above-described embodiment is achieved by executing the program code which is supplied to the computer, but also includes a case where the functions of the above-described embodiment are achieved by the combination of the program code and the OS (Operating System) or another application software which runs on the computer. In this case as well, it is apparent that the program code is included in an embodiment of the present invention.

Furthermore, it is apparent that the present invention includes a case where the functions of the above-described embodiment are achieved when the supplied program code is stored in the memory which is provided to the feature expansion board of a computer or the feature expansion unit connected to a computer, and then, a part of or the entire of actual processing is performed by the CPU and so on which is provided to the feature expansion board or the feature expansion unit, on the basis of the directions of the program code.

The invention may be embodied in other specific forms without departing from essential characteristics thereof.

Therefore, the above-described embodiments are merely exemplary of this invention, and are not be construed to limit the scope of the present invention.

The scope of the present invention is defined by the scope of the appended claims, and is not limited to only the specific description in this specification. Furthermore, all the modifications and changes belonging to equivalents of the claims are considered to fall within the scope of the present invention.

What is claimed is:

1. A recording system comprising:
   an image sensing device which (a) outputs AV data including video data, audio data and time information, (b) outputs control information which is used to prohibit a change of the time information included in the AV data, and (c) records the AV data on a first recording medium; and
   an external recording device which (a) inputs AV data from said image sensing device, (b) inputs the control information from said image sensing device, and (c) records the AV data on a second recording medium, wherein, in response to the control information output by said image sensing device and being detected by said external recording device, said external recording device records the AV data on the second recording medium without changing the time information included in the AV data.

2. A recording system according to claim 1, wherein said image sensing device outputs the AV data through an output unit conformed to the IEEE 1394-1995 standard, and said external recording device inputs the AV data through an input unit conformed to the IEEE 1394-1995 standard.

3. A recording system according to claim 1, wherein said image sensing device includes a camera and a digital video recorder.

4. A recording system according to claim 1, wherein said external recording device includes a hard disk device.

5. An image sensing device comprising:
   an AV data generator which generates AV data including video data, audio data and time information;
   a recorder which records the AV data on a first recording medium; and
   an output unit which outputs the AV data from said image sensing device and outputs control information from said image sensing device, the control information being used to prohibit a change of the time information included in the AV data,
   wherein, in response to the control information output by said image sensing device and being detected by an external recording device, the external recording device records the AV data on a second recording medium without changing the time information included in the AV data.

6. An image sensing device according to claim 5, wherein said output unit conforms to the IEEE 1394-1995 standard.

7. An image sensing device according to claim 5, wherein said image sensing device includes a camera and a digital video recorder.

8. A recording device comprising:
   an input unit which inputs AV data including video data, audio data and time information, and inputs control information from a device that outputs the AV data, the control information being used to prohibit a change of the time information included in the AV data;
   a detector which detects the control information; and
   a recorder which records the AV data on a recording medium without changing the time information included in the AV data, in response to the control information being detected by said detector.

9. An recording device according to claim 8, wherein said input unit conforms to the IEEE 1394-1995 standard.

10. A recording device according to claim 8, wherein said recording device includes a hard disk device.

11. A method for controlling an image sensing device, comprising the steps of:
    generating AV data including video data, audio data and time information;
    recording the AV data on a first recording medium;
    outputting the AV data from the image sensing device; and
    outputting control information from the image sensing device, the control information being used to prohibit a change of the time information included in the AV data,
    wherein, in response to the control information output by the image sensing device and being detected by an external recording device, the external recording device records the AV data on a second recording medium without changing the time information included in the AV data.

12. A method according to claim 11, wherein the AV data is output from the image sensing device through an output unit conformed to the IEEE 1394-1995 standard.

13. A method according to claim 11, wherein the image sensing device includes a camera and a digital video recorder.

14. A method for controlling a recording device, comprising the steps of:
    inputting AV data including video data, audio data and time information;
    inputting control information from a device that outputs the AV data, the control information being used to prohibit a change of the time information included in the AV data;
    detecting the control information; and
    recording the AV data on a recording medium without changing the time information included in the AV data, in response to the control information being detected in said detecting step.

15. A method according to claim 14, wherein the AV data is input to the recording device through an input unit conformed to the IEEE 1394-1995 standard.

16. A method according to claim 14, wherein the recording device includes a hard disk device.

* * * * *

UNITED STATES PATENT AND TRADEMARK OFFICE
CERTIFICATE OF CORRECTION

PATENT NO. : 7,315,689 B2  Page 1 of 1
APPLICATION NO. : 10/029674
DATED : January 1, 2008
INVENTOR(S) : Tachio Ono It is certified that error appears in the above-identified patent and that said Letters Patent is hereby corrected as shown below:

COLUMN 1
Line 56, "perform" should read --performs--.

COLUMN 2
Line 44, "output" should read --outputs--.

COLUMN 6
Line 26, "is" should read --are--.
Line 39, "entire" should read --entirety--.

COLUMN 8
Line 1, "An" should read --A--.

Signed and Sealed this

Sixteenth Day of December, 2008

JON W. DUDAS
*Director of the United States Patent and Trademark Office*